(12) United States Patent
Hallundbæk et al.

(10) Patent No.: US 9,416,629 B2
(45) Date of Patent: Aug. 16, 2016

(54) DOWNHOLE TOOL CAPABLE OF WITHSTANDING HIGH TEMPERATURES

(71) Applicant: WELLTEC A/S, Allerød (DK)

(72) Inventors: Jørgen Hallundbæk, Græsted (DK); Anders Just Nørgaard, Virum (DK)

(73) Assignee: WELLTEC A/S, Allerød (DK)

( * ) Notice: Subject to any disclaimer, the term of this patent is extended or adjusted under 35 U.S.C. 154(b) by 0 days.

(21) Appl. No.: 14/782,956

(22) PCT Filed: Apr. 16, 2014

(86) PCT No.: PCT/EP2014/057703
§ 371 (c)(1),
(2) Date: Oct. 7, 2015

(87) PCT Pub. No.: WO2014/170361
PCT Pub. Date: Oct. 23, 2014

(65) Prior Publication Data
US 2016/0069166 A1    Mar. 10, 2016

(30) Foreign Application Priority Data
Apr. 18, 2013 (EP) .................................... 13164254

(51) Int. Cl.
*H02H 9/00* (2006.01)
*E21B 41/00* (2006.01)
(Continued)

(52) U.S. Cl.
CPC ............... *E21B 41/0085* (2013.01); *E21B 4/04* (2013.01); *E21B 4/18* (2013.01); *H02H 9/04* (2013.01); *H02H 9/041* (2013.01); *H02H 9/042* (2013.01)

(58) Field of Classification Search
CPC .................................................. E21B 41/0085
USPC ......................................................... 361/54
See application file for complete search history.

(56) References Cited

U.S. PATENT DOCUMENTS 3,751,192 A * 8/1973 Boyd .................... E21B 43/128
                                                                318/432
5,617,308 A * 4/1997 Weise ................. H02M 7/4826
                                                                363/132

(Continued)

FOREIGN PATENT DOCUMENTS

EP           1 808 953        7/2007
WO     WO 2010/110952         9/2010

OTHER PUBLICATIONS

International Preliminary Report on Patentability dated Oct. 29, 2015 issued in PCT/EP2014/057703 (6 pages).

(Continued)

*Primary Examiner* — Stephen W Jackson
(74) *Attorney, Agent, or Firm* — Nixon & Vanderhye P.C.

(57) ABSTRACT

The present invention relates to a downhole wireline tool for performing an operation in a well at a depth of up to 15 km downhole, the tool being powered by direct current at a predetermined voltage in a first end by a power supply unit which is configured to provide a specific steady-state voltage selected from a plurality of predetermined voltages, comprising an electrical motor being powered by alternating current, a frequency converter arranged between the first end and the motor, and a voltage peak reduction unit adapted to reduce the steady-state voltage of the selected power supplied to the frequency converter from the power supply, the voltage peak reduction unit comprising a capacitor, wherein the capacitor is a high temperature capacitor having a dielectric comprising a material capable of resisting a temperature above 150° C. Furthermore, the present invention relates to a downhole tool string and to a method of protecting a frequency converter from peaks of voltage in power supplied to the frequency converter in a downhole tool according to the present invention.

16 Claims, 4 Drawing Sheets

(51) Int. Cl.
*E21B 4/04* (2006.01)
*E21B 4/18* (2006.01)
*H02H 9/04* (2006.01)

(56) References Cited

U.S. PATENT DOCUMENTS

| | | | | |
|---|---|---|---|---|
| 6,045,333 | A | | 4/2000 | Breit |
| 6,141,228 | A | * | 10/2000 | Maurio ............... H02M 7/4826 363/131 |
| 6,176,308 | B1 | * | 1/2001 | Pearson ................ E21B 43/128 166/65.1 |
| 6,544,691 | B1 | * | 4/2003 | Guidotti .................. H01M 4/40 429/307 |
| 7,040,391 | B2 | * | 5/2006 | Leuthen .............. H02M 5/4585 166/65.1 |
| 8,149,552 | B1 | * | 4/2012 | Cordill .................. E21B 43/128 361/42 |
| 8,665,110 | B2 | * | 3/2014 | Coenen ..................... E21B 4/04 166/105.5 |

OTHER PUBLICATIONS

International Search Report for PCT/EP2014/057703, mailed Jan. 6, 2015, 4 pages.
Written Opinion of the ISA for PCT/EP2014/057703, mailed Jan. 6, 2015, 4 pages.

* cited by examiner

DOWNHOLE TOOL CAPABLE OF WITHSTANDING HIGH TEMPERATURES

This application is the U.S. national phase of International Application No. PCT/EP2014/057703 filed 16 Apr. 2014, which designated the U.S. and claims priority to EP Patent Application No. 13164254.8 filed 18 Apr. 2013, the entire contents of each of which are hereby incorporated by reference.

FIELD OF THE INVENTION

The present invention relates to a wireline downhole tool for performing an operation in a well downhole, the tool being powered by a direct current source at a predetermined voltage in a first end by a power supply unit which is configured to provide a specific steady-state voltage selected from a plurality of predetermined voltages. Furthermore, the present invention relates to a downhole tool string and to a method of protecting a frequency converter from peaks of steady-state voltage in selected power supplied to the frequency converter in a downhole tool according to the present invention.

BACKGROUND ART

When operating in downhole wells, temperature and pressure are often high. However, in some wells the temperature is extremely high, which presents a great challenge with regard to any equipment lowered into these high temperature wells. Especially, the use of electronically operated tools in such high temperature wells is very challenging. Therefore, the operators often choose to use coiled tubing equipment instead of wireline tools to perform operations in these high temperature wells, since coiled tubing operations are controlled primarily by fluid supplied down through the coiled tubing.

SUMMARY OF THE INVENTION

It is an object of the present invention to wholly or partly overcome the above disadvantages and drawbacks of the prior art. More specifically, it is an object to provide an improved wireline tool capable of running in high temperature wells.

The above objects, together with numerous other objects, advantages, and features, which will become evident from the below description, are accomplished by a solution in accordance with the present invention by a downhole wireline tool for performing an operation in a well at a depth of up to 15 km downhole, the tool being powered by direct current at a predetermined voltage in a first end by a power supply unit which is configured to provide a specific steady-state voltage selected from a plurality of predetermined voltages, comprising:
   an electrical motor being powered by alternating current,
   a frequency converter arranged between the first end and the motor, and
   a voltage peak reduction unit adapted to reduce the steady-state voltage of the selected power supplied to the frequency converter from the power supply, the voltage peak reduction unit comprising a capacitor,
wherein the capacitor is a high temperature capacitor having a dielectric comprising a material capable of resisting a temperature above 150° C.

The term "steady-state" should in this context be interpreted broadly as a condition of constant, or slightly varying, properties. Although also including conditions of slowly increasing or decreasing character, such as the voltage curve shown in FIG. 3, "steady-state" is not considered to include rapid, and often undesired, conditions such as voltage spikes and transients.

The downhole wireline tool as described above may further comprise operational means, such as an operational tool or wheels for propelling the wireline downhole tool, demanding a varying amount of the selected power down through the wireline.

In an embodiment, the voltage peak reduction unit may comprise a resistor connected with a transistor which is activated by a control unit, so that when the steady-state voltage of selected power exceeds a predetermined level, the control unit activates the transistor which then allows excessive power to be dissipated in the resistor.

In certain embodiments, the dielectric of the capacitor may be a solid dielectric.

Also, the dielectric may comprise Polytetrafluoroethylene (PTFE) or ceramics.

The downhole tool as described above may comprise a plurality of capacitors.

Moreover, the tool may be connected with the power supply via the wireline, the wireline being connected with the first end of the tool.

Furthermore, the power supplied to the motor may have a voltage between 90-900 VAC, preferably a voltage between 90-500 VAC. The power may be supplied as alternating current.

Further, the selected power supplied to the frequency converter may have a steady-state voltage between 500-900 V, preferably a steady-state voltage between 600-700 V. The selected power may be supplied as direct current.

Additionally, the voltage peak reduction unit may comprise a crowbar circuit.

In the downhole tool as described above, the capacitor may have a capacitance between 80 μF and 150 μF.

Also, the capacitor may have a capacitance of at least 100 μF.

Further, the frequency converter may supply power to the motor with a frequency of 20-120 Hz.

In an embodiment, the predetermined level of steady-state voltage may be 750-1200 V.

Moreover, the voltage peak reduction unit may be releasably connected with a tool body so that the voltage peak reduction unit is replaceable.

In addition, the voltage peak reduction unit may comprise a measuring unit for measuring the steady-state voltage of selected power at an input side of the voltage peak reduction unit.

The present invention also relates to a downhole tool string comprising the downhole tool as described above and an operational tool, such as a milling tool.

Finally, the present invention relates to a method of protecting a frequency converter from peaks of steady-state voltage in selected power supplied to the frequency converter in a downhole wireline tool according to any of the preceding claims, comprising the steps of:
   arranging a voltage peak reduction unit in the downhole tool between the power supply and the frequency converter,
   supplying power to the voltage peak reduction unit in the downhole tool,
   measuring the steady-state voltage of selected power at an input side of the voltage peak reduction unit, and
   reducing peaks of steady-state voltage in the power being above a predetermined level of voltage.

BRIEF DESCRIPTION OF THE DRAWINGS

The invention and its many advantages will be described in more detail below with reference to the accompanying schematic drawings, which for the purpose of illustration show some non-limiting embodiments and in which.

All the figures are highly schematic and not necessarily to scale, and they show only those parts which are necessary in order to elucidate the invention, other parts being omitted or merely suggested.

DETAILED DESCRIPTION OF THE INVENTION

Figure 1:
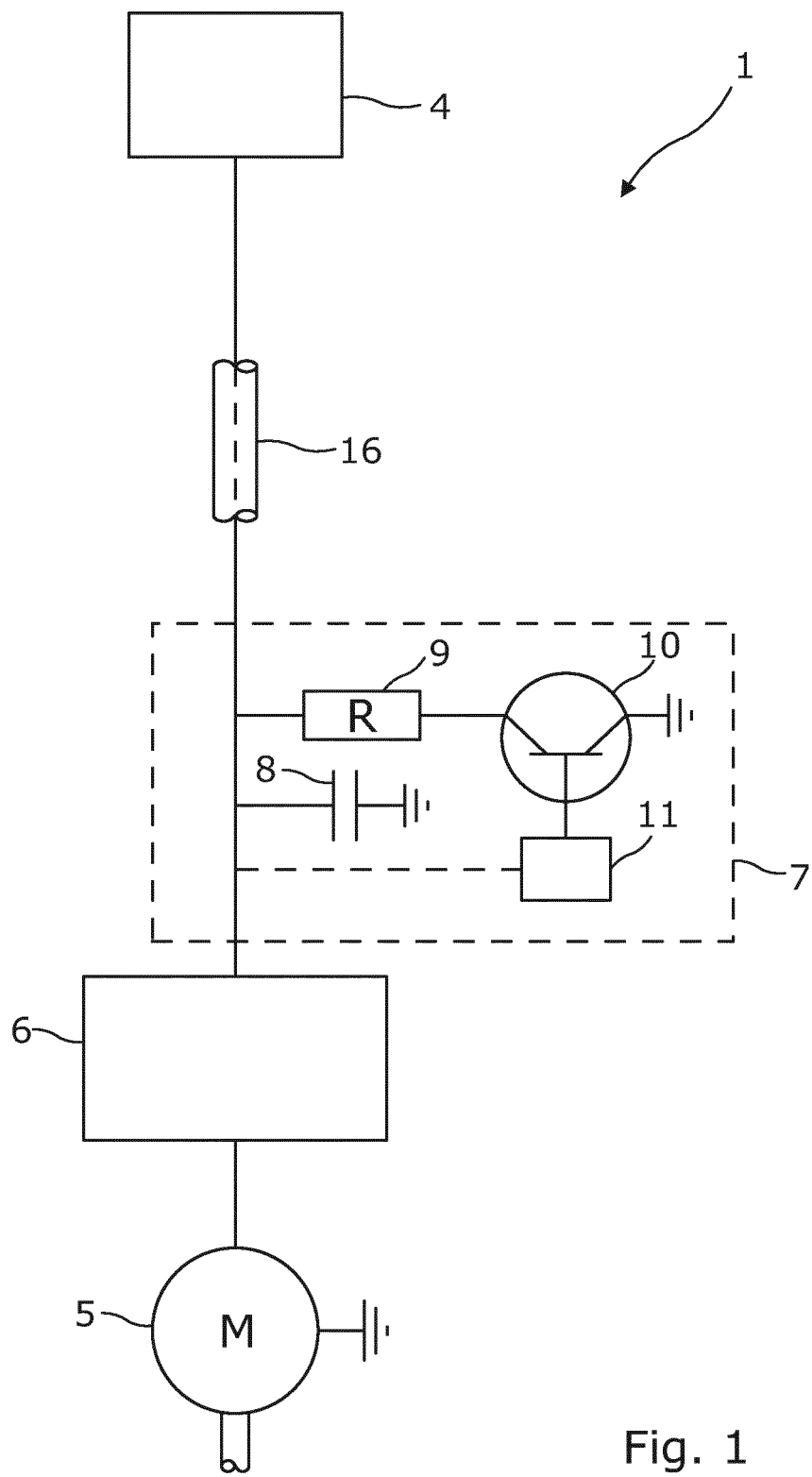
FIG. 1 illustrates a simplified circuit model of the electrical circuit.

FIG. 1 shows a simplified circuit model of the electrical circuit for powering an electrical motor 5 in a downhole wireline tool 1 for performing an operation in a well downhole. The tool is powered by direct current at a predetermined steady-state voltage in a first end of the tool by a power supply unit 4. The power supply unit 4 is configured to provide the specific steady-state voltage from a plurality of predetermined voltages, and the power supply is most often located at the top of the well and powers the submerged tool down the well through a wireline 16 connected with the first end of the tool. The downhole wireline tool 1 furthermore comprises a frequency converter 6 arranged between the first end and the motor 5 and thus arranged in the tool, so that selected power is supplied from the power supply unit 4 through the wireline 16 and the frequency converter 6 to the motor 5. The motor is thus powered by alternating current.

When supplying steady-state voltage down through a long wireline, the voltage of power supplied to the tool is substantially reduced, and when the tool downhole demands a significantly higher amount of power due to a temporary, demanding operation, the supply of power is delayed, also due to the long cable. Thus, when the operation is no longer demanding the significantly higher amount of power, the adjustment of power to the tool is delayed accordingly. Thus, after the need of a high amount of power and before the power fed to the tool is adjusted due to the delay through the wireline, the tool is fed too much power.

Therefore, the downhole tool 1 comprises a voltage peak reduction unit 7 for reducing the steady-state voltage of the selected power supplied to the frequency converter from the power supply. The steady-state voltage is reduced due to the fact that a frequency converter cannot withstand voltage above a predetermined voltage level without being permanently damaged. Therefore, the voltage peak reduction unit 7 is arranged to secure that the steady-state voltage supplied to the frequency converter does not exceed the predetermined voltage level. In order to be capable of reducing the steady-state voltage, the voltage peak reduction unit comprises a capacitor 8. The capacitor is a high temperature capacitor having a dielectric comprising a material capable of resisting a temperature above 150° C., e.g. around 175° C. In this way, the capacitor is capable of withstanding a temperature above 150° C., and the tool can be submerged into wells having a high temperature and pressure without risking that the capacitor will be destroyed. Tests have shown that when a tool fails to perform a job, the capacitor is often damaged. When the tool operates in the well, where the tool surroundings have a high temperature thus heating the electrical components, which causes the temperature to rise in the capacitor, then the hazardous liquid in the capacitor is heated, causing it to leak from the capacitor. When the liquid leaks from the capacitor, the capacitor performance decreases, resulting e.g. in the occurrence of oscillating voltage, and in the end the capacitor may even break down in the high temperature environment downhole. Subsequently, the frequency convertor will stop functioning, causing immediate stop of the tool and the tool then has to be withdrawn from the well for repair work. The withdrawal of a tool before the operation has ended, is time-consuming and therefore very expensive.

A high temperature capacitor capable of withstanding temperatures above 150° C. is unfortunately much larger in volume compared to known normal temperature capacitors with the same capacitance, energy density or energy storage capacity.

The length and the diameter of the tools are competitive parameters. This is due to the fact that sometimes the tools are restricted in size, i.e. the length is restricted by the length of the lubricator in the well head and the length of other operational sections in the tool, and the diameter is restricted by the inner diameter of the wellbore or casing. Therefore, since space is limited in downhole tools, i.e. the high temperature capacitors could consequently not fit into tools also fitting into the lubricator of the well while the capacitor has the same capacitance, energy density or energy storage capacity.

In FIG. 1, the voltage peak reduction unit 7 further comprises a resistor 9 connected with a transistor 10 which is activated by a control unit 11. When the voltage exceeds a predetermined level L, the control unit activates the transistor and thus "absorbs excessive power in" the resistor. By activating the transistor, power is led to the resistor and thus protects the frequency converter from overvoltage. As the steady-state voltage is reduced and the voltage drops below predetermined level L, the control unit deactivates the transistor, and all power is again fed to the frequency convertor. By having the resistor activated by the transistor and the control unit, the voltage peak reduction unit 7 is able to reduce the steady-state voltage before the voltage exceeds a destructive level, and it is therefore not necessary for the high temperature capacitor to have the same capacitance or energy storage capacity as the normal capacitor. The high temperature capacitor can therefore be significantly reduced in energy storing capacity and therefore in volume. By having the resistor activated by the transistor and the control unit, the high temperature capacitor is able to fit into a downhole tool, and the downhole tool is then capable of withstanding the high temperatures in some wells. The control unit may, in one embodiment, be a micro processor.

Figure 2:
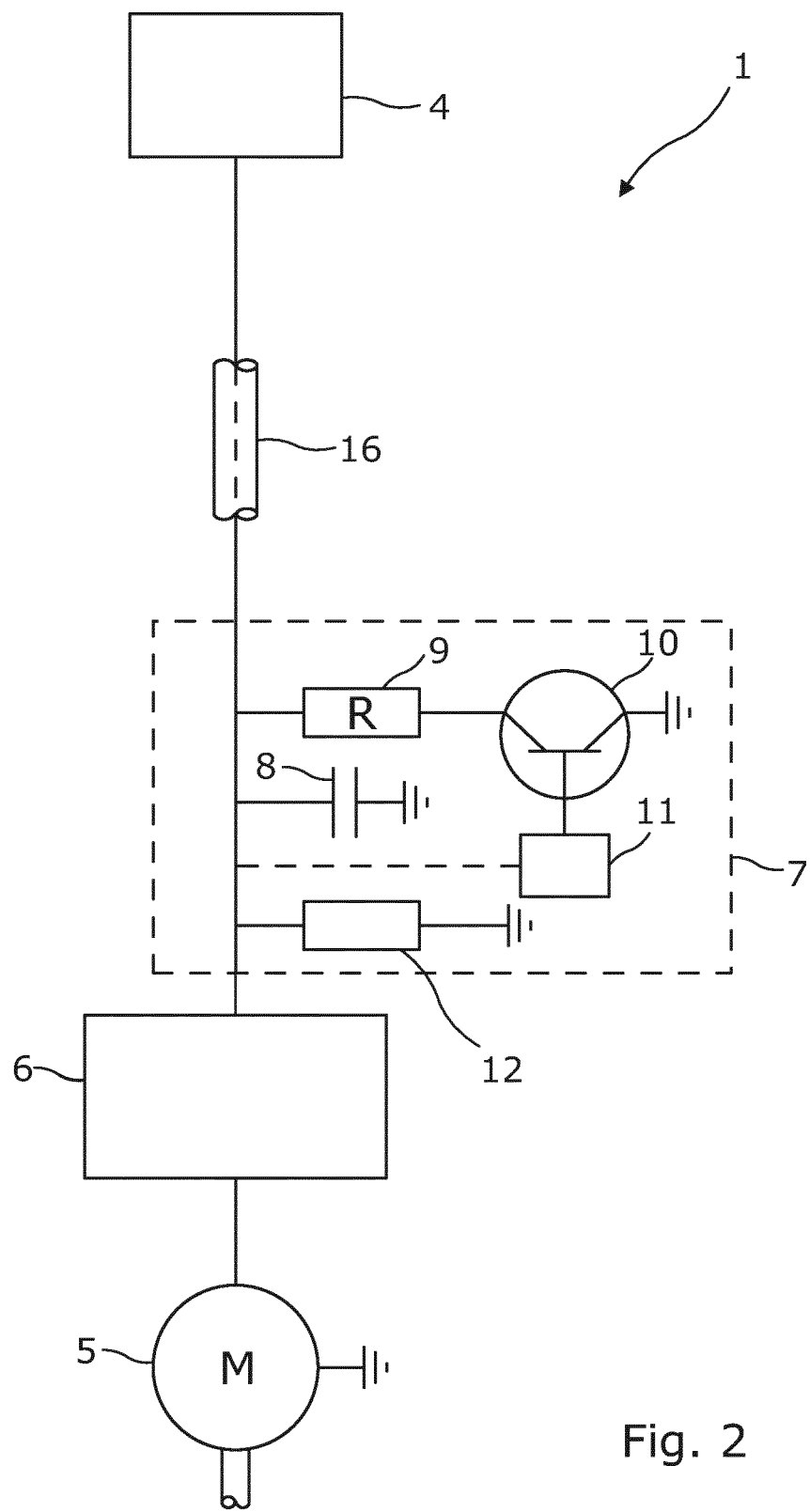
FIG. 2 illustrates another embodiment of a simplified circuit model of the electrical circuit.

In FIG. 2, the voltage peak reduction unit 7 further comprises a crowbar circuit 12 which is earthed or connected to ground. By having a crowbar circuit 12, the voltage peak reduction unit 7 is always capable of reducing the power and thus protect the frequency convertor from a steady-state voltage above a second predetermined level which is higher than the predetermined level L (shown in FIG. 3) at which the control activates the transistor. If, for some reason, the capacitor does not function properly and therefore does not reduce the steady-state voltage to a sufficient extent, the crowbar circuit 12 protects the frequency converter and the electrical circuit is disconnected. The tool then needs to be restarted before the operation can continue and the capacitor may need to be replaced.

Figure 3:
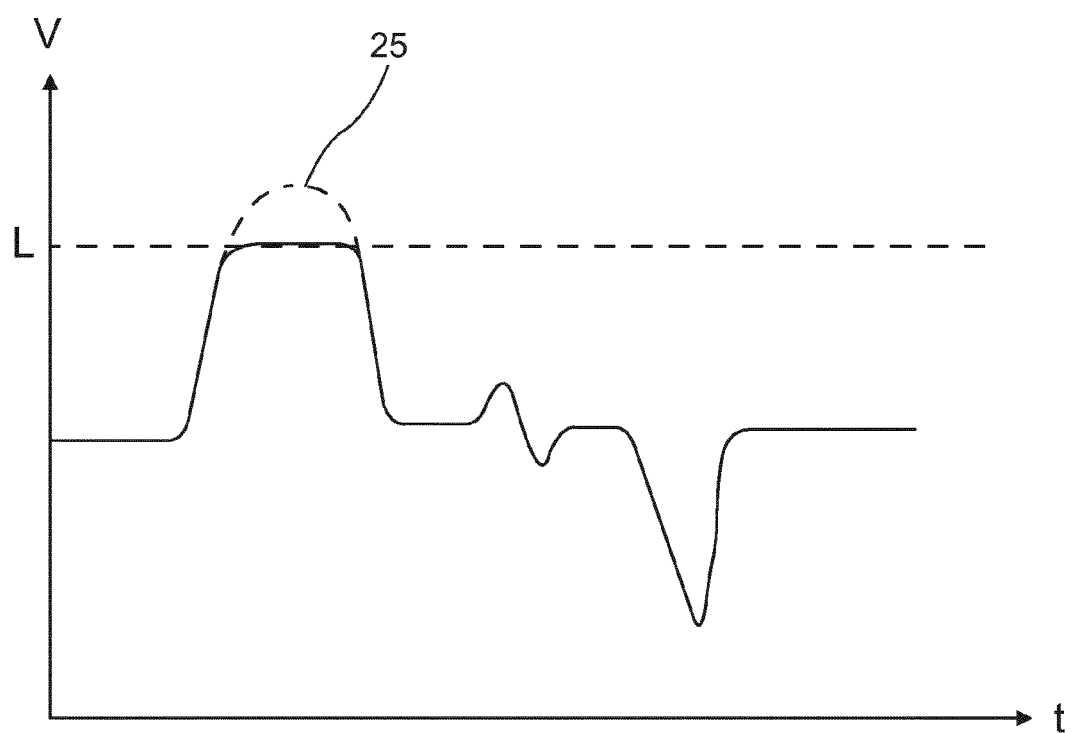
FIG. 3 is a schematic diagram of a power voltage supplied to the frequency converter.

A schematic diagram of a power voltage supplied to the frequency converter is shown in FIG. 3. L is the predetermined level L at which the control activates the transistor and the steady-state voltage is reduced as illustrated by the dotted line 25. During an operation, the motor needs more or less power, and when the motor uses more power, the power supply unit supplies more power, and before the power reaches the voltage peak reduction unit, the motor may use less power again and the steady-state voltage reaches the predetermined level L and the voltage peak reduction unit reduces the steady-state voltages before being supplied to the frequency converter.

The steady-state voltage of selected power supplied to the motor is 90-500 VAC and the power supplied to the frequency converter is 500-900 V, but the steady-state voltage supplied to the wireline 16 is then significantly higher, preferably between 600V and 1800 V, and more preferably between 600 V and 1500 V. This is due to the fact that the wireline is up to 15 km in length and thus forms a resistor, and the power supplied down through the wireline thus depends on the length and the characteristics of the wireline.

The dielectric of the high temperature capacitor is a solid dielectric, and may comprise Polytetrafluoroethylene (PTFE) or ceramics. The tool may comprise a plurality of capacitors rather than only one large capacitor. When the capacitor comprises ceramics, bumps from the tool bumping into the wall of the well may cause parts of the ceramics to be broken off from the capacitor and thus the capacitor fails to function. Therefore, when using ceramics in the capacitor, it is preferred to use several capacitors, so that in the event that bumps occur and one capacitor may stop functioning, the others will probably continue to function.

The capacitor capable of withstanding temperatures above 150° C. has a capacitance between 80 µF and 150 µF, more preferably between 100 µF and 150 µF. The known capacitors which are not capable of withstanding high temperatures above 150° C., have a capacitance around 470 µF. By having the voltage peak reduction unit, the high temperature capacitor capable of withstanding temperatures above 150° C. only needs to have a capacitance of 80-150 µF and is thus able to fit into a downhole tool which is limited in both diameter and length since such tools need to be able to fit into the well and especially the launching equipment at the top of the well, such as the lubricator.

The frequency converter supplies power to the motor with a frequency of 20-120 Hz. In some operations downhole, the motor needs to run slowly, such as in a milling operation, and in other operations the motor runs closer to its maximum level. By having a frequency converter supplying power to the motor with a frequency of 20-120 Hz, the tool is able to perform a greater variety of operations than if the tool was an AC operating tool without a frequency converter.

The predetermined level of voltage L is 750-1200, preferably 750-1000, more preferably 800-900. The predetermined level L is a maximum level of voltage supplied to the frequency converter, and as illustrated in FIG. 3, the steady-state voltage is reduced so that the steady-state voltage supplied to the frequency converter does not exceed this predetermined level L.

The voltage peak reduction unit comprises a measuring unit for measuring the power voltage at an input side of the voltage peak reduction unit. The measuring unit may comprise a resistive divider network arranged around the wireline in order to measure the steady-state voltage.

Figure 4:
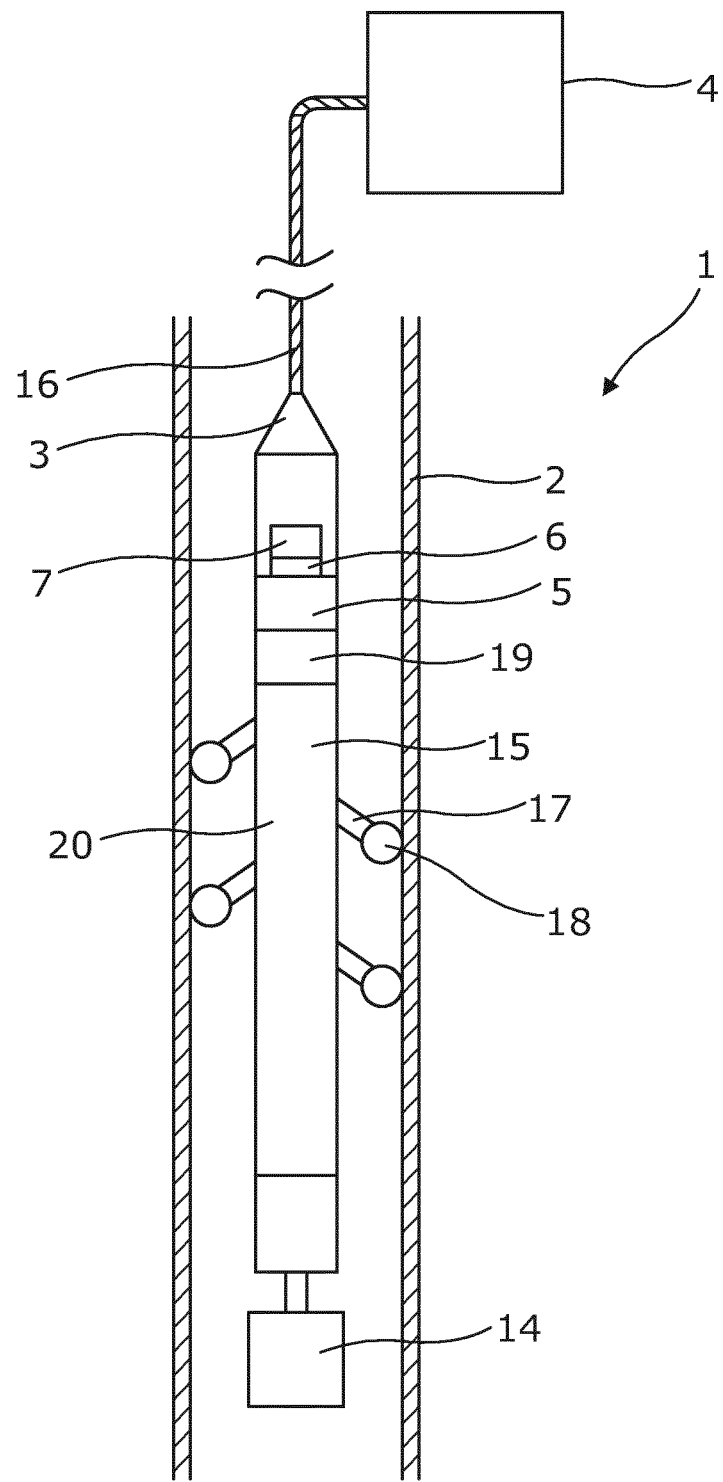
FIG. 4 shows the downhole tool in a well.

As shown in FIG. 4, the downhole tool is part of a downhole tool string having an operational tool 14, such as a milling tool, a stroking tool, a key tool, an anchor tool or a third party tool. The wireline tool may furthermore have operational means such as wheels for propelling the tool forwards or backwards in the well.

The power supply unit 4 is arranged at the top of the well and connected with the first end 3 of the tool by means of a wireline 16. The tool is submerged into a downhole well having a casing 2 or into an open hole. The tool further comprises a voltage peak reduction unit 7 which is arranged between the first end 3 and the frequency converter 6. The frequency converter is arranged between the voltage peak reduction unit 7 and the motor 5. The motor drives a hydraulic block 19, powering the driving unit 15 and the operational tool 14.

When the wireline tool propels itself forwards in the well, one or more of the wheels may meet an obstacle, such as a restriction, a no-go etc., and in order to pass that obstacle, the tool needs more power. However, after having passed the obstacle, the tool no longer needs the excess power. The power-demanding operation may also occur when the operational tool, such as a milling tool, engages the object to be milled, or when the stroking tool needs to provide a stroking motion etc.

By having the peak voltage reduction unit, the frequency converter is thus protected from peaks of voltage in power as a result of a power-demanding operation where an excess of power is supplied to the tool and thus to the frequency converter in a downhole tool by arranging the voltage peak reduction unit in the downhole tool between the wireline and the frequency converter. The power is supplied to the voltage peak reduction unit in the downhole tool before the power is fed to the frequency converter and the steady-state voltage of power is measured at an input side of the voltage peak reduction unit, and peaks of steady-state voltage of power being above a predetermined level of voltage are reduced.

In one embodiment, the voltage peak reduction unit is releasably connected with a tool body 20 so that the voltage peak reduction unit is replaceable if the unit is damaged or needs to have a different configuration, e.g. for certain types of tool operations.

A stroking tool is a tool providing an axial force. The stroking tool comprises an electrical motor for driving a pump. The pump pumps fluid into a piston housing to move a piston acting therein. The piston is arranged on the stroker shaft. The pump may pump fluid into the piston housing on one side and simultaneously suck fluid out on the other side of the piston.

In the event that the tool is not submergible all the way into the well, as shown in FIG. 4, a downhole driving unit 15, such as a downhole tractor 15, can be used to push the tool all the way into position in the well. The downhole driving unit or tractor may have projectable arms 17 having wheels 18, wherein the wheels contact the inner surface of the casing for propelling the tractor and the tool forward in the casing. A downhole tractor is any kind of driving tool capable of pushing or pulling tools in a well downhole, such as a Well Tractor®.

Although the invention has been described in the above in connection with preferred embodiments of the invention, it will be evident for a person skilled in the art that several modifications are conceivable without departing from the invention as defined by the following claims.

The invention claimed is:

1. A downhole wireline tool for performing an operation in a well at a depth of up to 15 km downhole, the tool being powered by direct current at a predetermined voltage in a first end by a power supply unit which is configured to provide a specific steady-state voltage selected from a plurality of predetermined voltages, comprising:
   an electrical motor being powered by alternating current,
   a frequency converter arranged between the first end and the motor, and
   a voltage peak reduction unit adapted to reduce the steady-state voltage of the selected power supplied to the frequency converter from the power supply, the voltage peak reduction unit comprising a capacitor, wherein the capacitor is a high temperature capacitor having a dielectric comprising a material capable of resisting a temperature above 150° C.

2. A downhole wireline tool according to claim 1, further comprising operational means, such as an operational tool or wheels for propelling the wireline downhole tool, demanding a varying amount of the selected power down through the wireline.

3. A downhole wireline tool according to claim 1, wherein the dielectric of the capacitor is a solid dielectric.

4. A downhole wireline tool according to claim 1, wherein the voltage peak reduction unit comprises a resistor connected with a transistor which is activated by a control unit, so that when the steady-state voltage of selected power exceeds a predetermined level (L), the control unit activates the transistor which then allows excessive power to be dissipated in the resistor.

5. A downhole wireline tool according to claim 1, wherein the dielectric comprises Polytetrafluoroethylene (PTFE) or ceramics.

6. A downhole wireline tool according to claim 1, comprising a plurality of capacitors.

7. A downhole wireline tool according to claim 1, wherein the tool is connected with the power supply via the wireline, the wireline being connected with the first end of the tool.

8. A downhole wireline tool according to claim 1, wherein the selected power supplied to the motor has a steady-state voltage between 90-900 VAC.

9. A downhole wireline tool according to claim 1, wherein the voltage peak reduction unit comprises a crowbar circuit.

10. A downhole wireline tool according to claim 1, wherein the capacitor has a capacitance between 80 μF and 150 μF.

11. A downhole wireline tool according to claim 1, wherein the frequency converter supplies power to the motor with a frequency of 20-120 Hz.

12. A downhole wireline tool according to claim 1, wherein the predetermined level of steady-state voltage is 750-1200.

13. A downhole wireline tool according to claim 1, wherein the voltage peak reduction unit is releasably connected with a tool body so that the voltage peak reduction unit is replaceable.

14. A downhole wireline tool according to claim 1, wherein the voltage peak reduction unit comprises a measuring unit for measuring the steady-state voltage of selected power at an input side of the voltage peak reduction unit.

15. A downhole tool string comprising the downhole wireline tool according to claim 1 and an operational tool, such as a milling tool.

16. A method of protecting a frequency converter from peaks of steady-state voltage in selected power supplied to the frequency converter in a downhole wireline tool according to claim 1, comprising the steps of:

arranging a voltage peak reduction unit in the downhole tool between the power supply and the frequency converter, supplying power to the voltage peak reduction unit in the downhole tool, measuring the steady-state voltage of selected power at an input side of the voltage peak reduction unit, and reducing peaks of steady-state voltage in the power being above a predetermined level of voltage.

\* \* \* \* \*